(12) United States Patent
Eneau et al.

(10) Patent No.: US 10,767,491 B2
(45) Date of Patent: Sep. 8, 2020

(54) BLADE COMPRISING A TRAILING EDGE HAVING THREE DISTINCT COOLING REGIONS

(71) Applicant: SAFRAN AIRCRAFT ENGINES, Paris (FR)

(72) Inventors: Patrice Eneau, Moissy-Cramayel (FR); Sebastien Serge Francis Congratel, La Brosse Montceaux (FR); Charlotte Marie Dujol, La Mee sur Seine (FR); Philippe Picot, Le Chatelet en Brie (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 36 days.

(21) Appl. No.: 15/765,334

(22) PCT Filed: Oct. 4, 2016

(86) PCT No.: PCT/FR2016/052548
§ 371 (c)(1),
(2) Date: Apr. 2, 2018

(87) PCT Pub. No.: WO2017/060613
PCT Pub. Date: Apr. 13, 2017

(65) Prior Publication Data
US 2018/0306035 A1    Oct. 25, 2018

(30) Foreign Application Priority Data
Oct. 6, 2015  (FR) ...................................... 15 02074

(51) Int. Cl.
*F01D 5/18*       (2006.01)
*B22C 9/10*       (2006.01)

(52) U.S. Cl.
CPC .............. *F01D 5/186* (2013.01); *B22C 9/103* (2013.01); *F01D 5/187* (2013.01);
(Continued)

(58) Field of Classification Search
CPC .......... F01D 5/186; F01D 5/187; B22C 9/103
See application file for complete search history.

(56) References Cited

U.S. PATENT DOCUMENTS

| 2,700,530 A | 1/1955 | Williams |
| 3,017,159 A | 1/1962 | Foster et al. |

(Continued)

FOREIGN PATENT DOCUMENTS

| EP | 2 193 859 A1 | 9/2010 |
| EP | 2 604 795 A2 | 6/2013 |

OTHER PUBLICATIONS

International Search Report dated Feb. 28, 2017 in PCT/FR2016/052548, filed on Oct. 16, 2016.

*Primary Examiner* — J. Todd Newton
*Assistant Examiner* — Sabbir Hasan
(74) *Attorney, Agent, or Firm* — Oblon, McClelland, Maier & Neustadt, L.L.P.

(57) ABSTRACT

A turbine blade including a root bearing an aerofoil extending in a direction of span and ending in a tip, this aerofoil including a leading edge and a trailing edge which are connected by a pressure face wall and a suction face wall, the trailing edge including on the pressure face side cooling slots. The trailing edge includes one or more first slots close to the root, which are supplied via a lower cavity; one or more last slots near the tip which are supplied via an upper cavity; intermediate slots situated between the first slots and the last slots supplied with air via a downstream line set; and (Continued)

wherein the lower cavities and upper cavities and the downstream line set are supplied distinctly at the level of the root.

8 Claims, 3 Drawing Sheets

(52) U.S. Cl.
CPC .... *F05D 2230/21* (2013.01); *F05D 2240/122* (2013.01); *F05D 2260/202* (2013.01); *Y02T 50/676* (2013.01)

(56) References Cited

U.S. PATENT DOCUMENTS

| | | | |
|---|---|---|---|
| 7,104,757 B2* | 9/2006 | Gross | F01D 5/187 415/115 |
| 8,113,780 B2* | 2/2012 | Cherolis | B22C 7/02 416/97 R |
| 2005/0084370 A1 | 4/2005 | Gross | |
| 2008/0085193 A1 | 4/2008 | Liang | |
| 2010/0129195 A1 | 5/2010 | Surace et al. | |
| 2014/0093386 A1 | 4/2014 | Pointon et al. | |

* cited by examiner

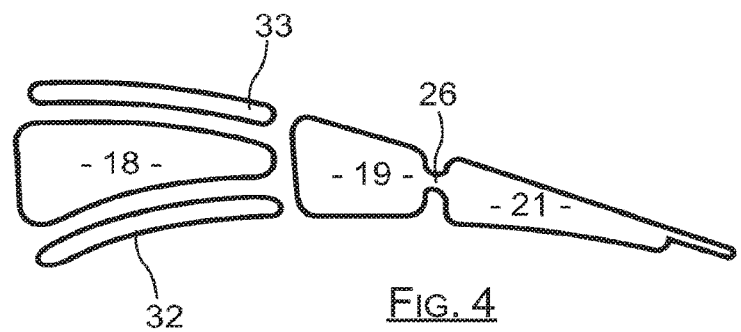
FIG. 4
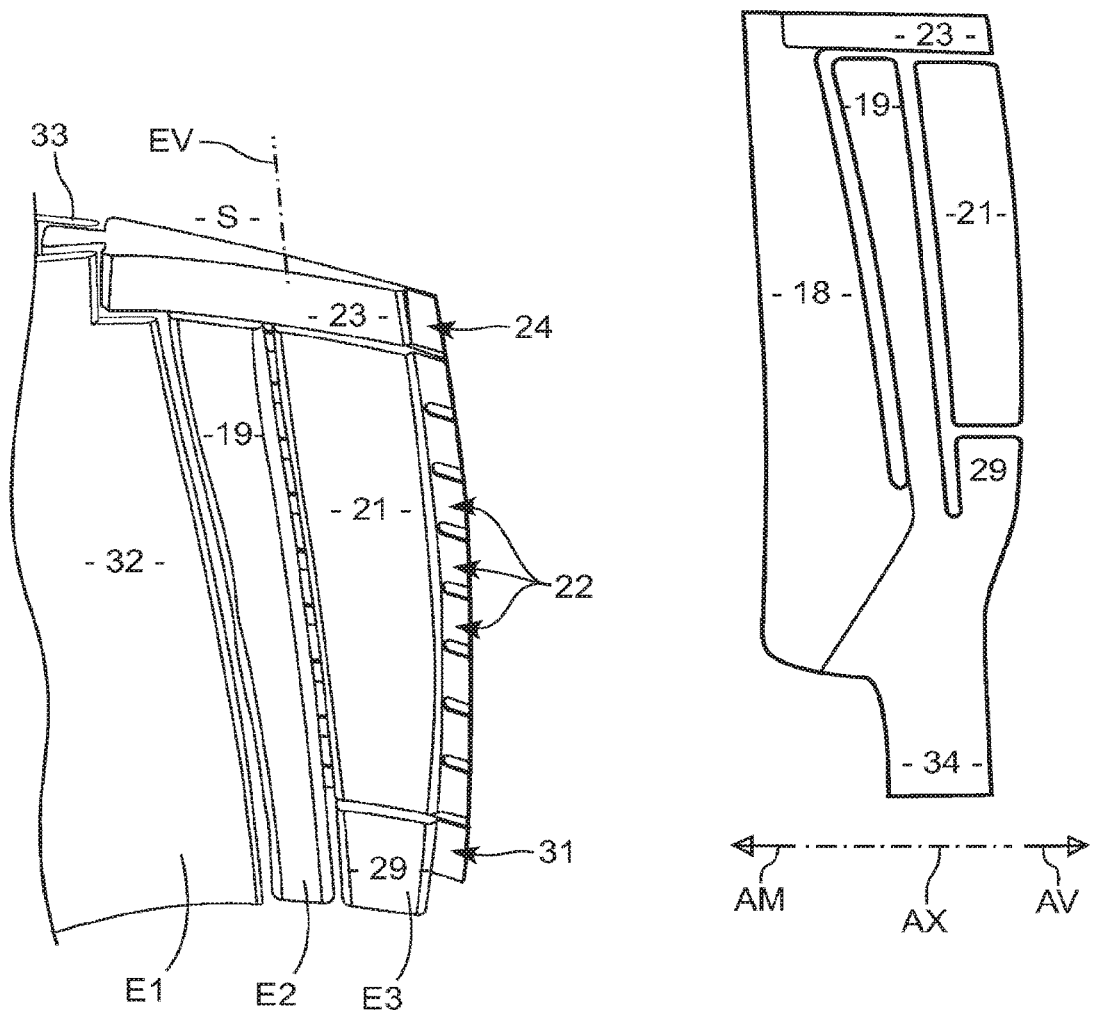
FIG. 5
FIG. 6

BLADE COMPRISING A TRAILING EDGE HAVING THREE DISTINCT COOLING REGIONS

TECHNICAL FIELD

The invention relates to a vane of an aircraft engine of the turbomachine type, such as for example a dual flow turbofan engine or a dual flow turboprop engine.

STATE OF PRIOR ART

In such an engine 1, outside air is taken into an inlet duct 2 to pass through a fan 3 including a series of rotating blades before being split into a central primary flow and a secondary flow surrounding the primary flow.

The primary flow is then compressed by passing through a first and a second compression stage 4 and 6, before coming into a combustion chamber 7, after which it expands by passing through a set of turbines 8 before being rearwardly discharged, generating thrust. The secondary flow is in turn directly rearwardly propelled by the fan to generate a further thrust.

The expansion in the turbines 8, which enables the compressor 4, 6 and the fan 3 to be driven, takes place at a high temperature because it immediately happens after combustion. This turbine 8 is thus designed and dimensioned to operate under severe temperature, pressure and fluid flow rate conditions.

Each turbine includes a succession of stages each comprising a series of vanes supported by the drive shaft, the vanes subjected to the most severe conditions being those of the first expansion stages, called high pressure stages.

Performance needs result in designing engines operating in increasingly severe environments, which implies to increase the temperature resistance of the high pressure vanes, and consequently to reconsider cooling thereof.

Cooling is provided by circulating inside the vane fresh air drawn upstream of the combustion and taken in at the vane root, to travel along an inner circuit of the vane.

This circuit has typically a so-called paper clip shape by extending on the entire height of the vane, from the leading edge located upstream of this vane to the trailing edge located downstream of the vane, the upstream and downstream extending with respect to the circulation direction of the fluid surrounding the operating vane.

The cooling air circulating in the vane is discharged therefrom by drillings passing through its wall, which further enable an air film cooler than air from the combustion to be created at the outer surface of the vane in order, to limit the vane temperature.

The purpose of the invention is to provide a vane structure enabling its cooling efficiency to be improved at the trailing edge of this vane.

DISCLOSURE OF THE INVENTION

To that end, one object of the invention is to provide a vane for a turbomachine turbine such as a turboprop engine or a turbofan engine, this vane comprising a root carrying a blade extending along a span direction ending in an apex, this blade comprising a leading edge and a trailing edge located downstream of the leading edge, this blade comprising a pressure face wall and a suction face wall each connecting the leading edge to the trailing edge, the trailing edge including on the pressure face side, a series of through slots supplied with cooling air, characterised in that these slots include:

one or more first slots which are closest to the root and which are supplied by a lower cavity of the vane;

one or more last slots which are closest to the apex and which are supplied by an upper cavity of the vane;

intermediate slots located between the first slots and the last slots and which are supplied by a downstream ramp of the blade;

and in that the lower cavity, the upper cavity and the downstream ramp are distinctly supplied with air at the root of the vane.

By virtue of this arrangement, cooling the trailing edge can be improved at the apex of the vane and at its base, that is in the vicinity of its root. Indeed, the region of the trailing edge apex is strongly stressed because of temperatures which are very high therein in particular, and the trailing edge base is also strongly stressed because it supports all the centrifugal strains applied to the operating blade.

The invention also relates to a vane thus defined, comprising a downstream duct for supplying the downstream ramp with air, this downstream duct being connected to the downstream ramp by a series of holes to provide calibrated supply to this downstream ramp.

The invention also relates to a vane thus defined, wherein the lower cavity and the ramp for cooling the intermediate slots extend as an extension of each other along the span direction of the blade.

The invention also relates to a vane thus defined, comprising a single first slot and/or a single last slot.

The invention also relates to a vane thus defined, wherein the upper cavity is located at the apex of the vane by being arranged to cool this apex.

The invention also relates to a vane thus defined, comprising a pressure face side cavity located between the central duct and the pressure face wall of the blade to make a heat screen protecting the central duct.

The invention also relates to a vane thus defined, comprising a suction face side cavity located between the central duct and the suction face wall of the blade to make a heat screen protecting the central duct.

The invention also relates to moulding means for manufacturing a vane thus defined, comprising a core for delimiting at least one part of the inner space of the vane when manufactured by moulding.

Another object of the invention is also a turbomachine turbine comprising a vane thus defined.

Another object of the invention is also a turbomachine comprising a turbine thus defined.

BRIEF DESCRIPTION OF THE DRAWINGS

FIG. 4 is a transverse cross-section view of a set of cores delimiting the inside of the vane according to a second embodiment of the invention;

FIG. 5 is a perspective view of a set of cores delimiting the inside of the vane according to the second embodiment of the invention;

FIG. 6 is a side view of a set of core delimiting the vane according to an alternative to the second embodiment of the invention.

DETAILED DISCLOSURE OF PARTICULAR EMBODIMENTS

Figure 1:
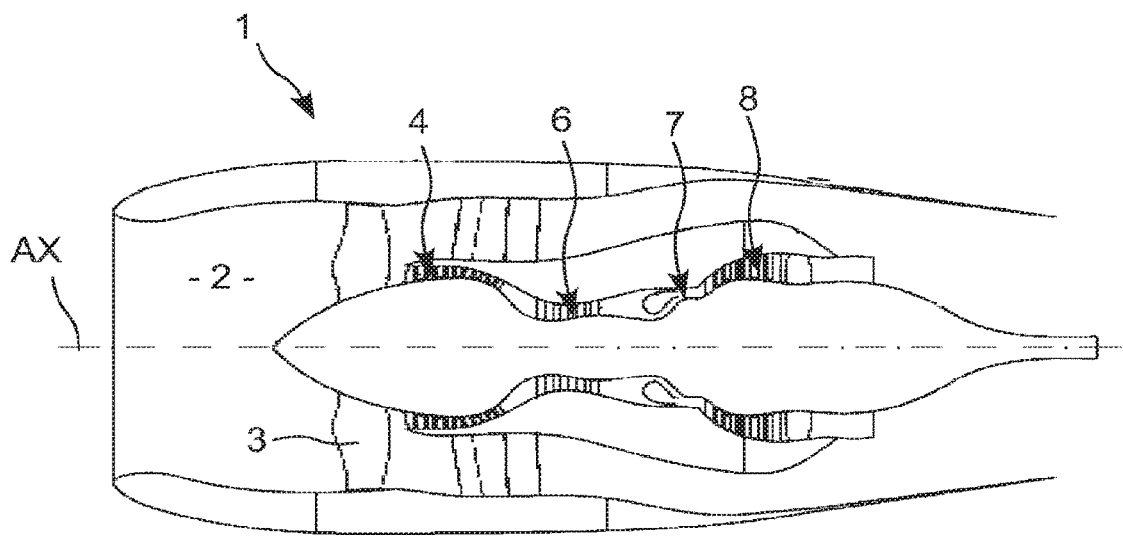
FIG. 1 is a schematic longitudinal cross-section view of a dual flow turbofan engine.
Figure 2:
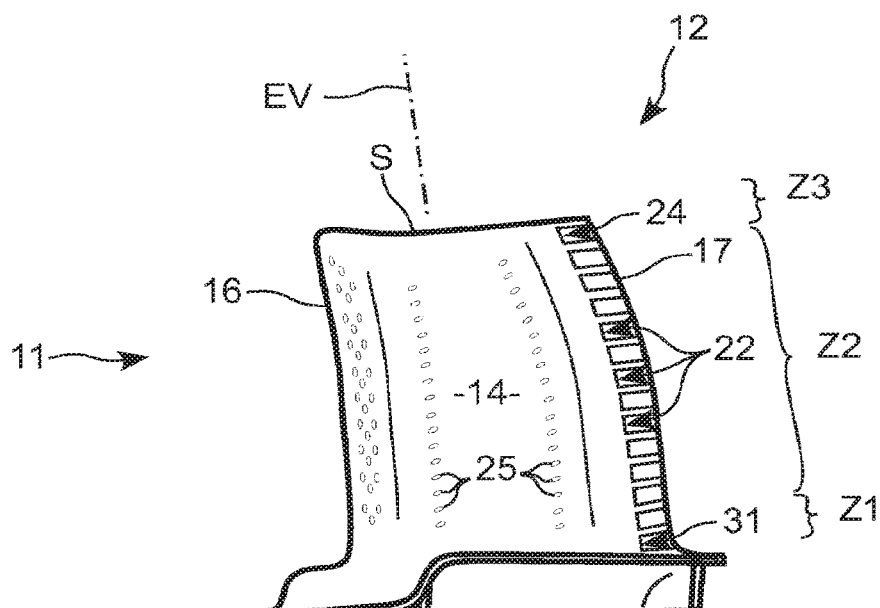
FIG. 2 is a perspective view of a vane according to the invention.
Figure 2:
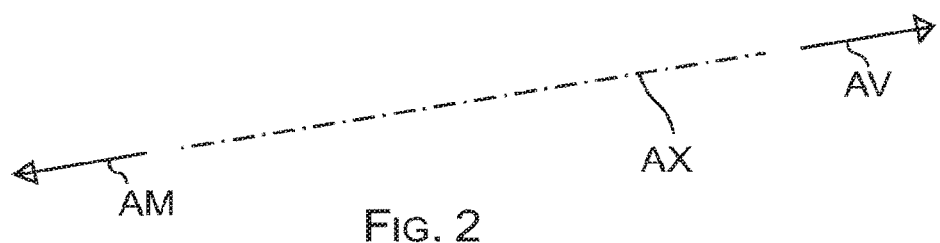

The vane according to the invention which appears in FIG. 2 by being referred to as 11 includes a root P carrying a blade 12 extending along a span direction EV which is radial with respect to its axis of rotation AX. The blade 12 extends from a base or platform through which it is connected to the root P up to an apex S corresponding to its free end, and it includes a suction face wall as well as a pressure face wall 14.

The suction face and pressure face 14 join each other on the one hand at the leading edge 16 of the blade which corresponds to its upstream region AM, and on the other hand at its tapered trailing edge 17 which corresponds to its downstream region AV. The upstream and downstream extend with respect to the circulation direction of the fluid surrounding the blade during operation.

Figure 3:
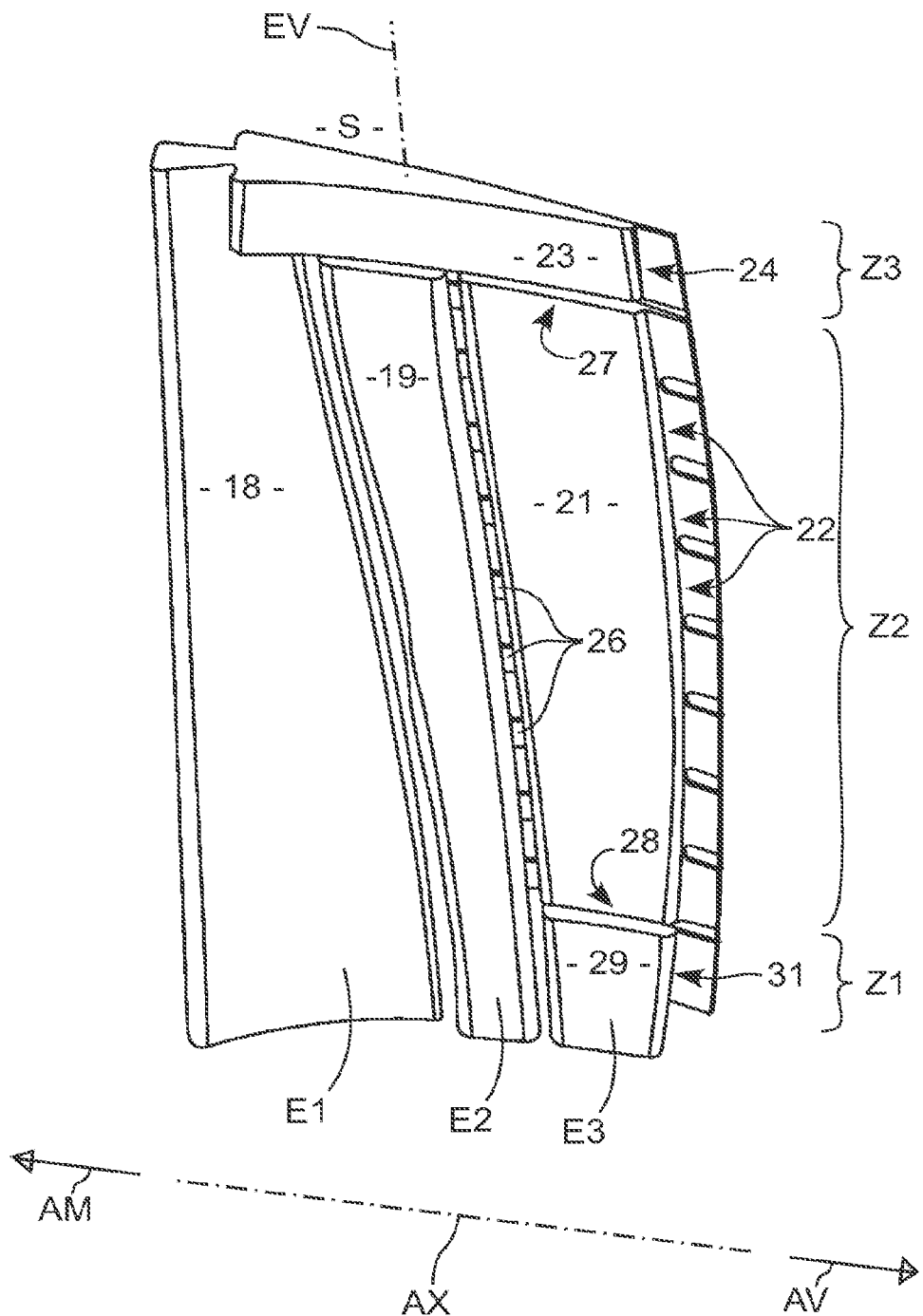
FIG. 3 is a perspective view of a set of cores delimiting the inside of the vane according to the invention upon moulding thereof.

As visible in FIGS. 3 and 4, the inside of this vane includes a central duct 18 downstream of which a downstream duct 19 which comes along the central duct 18 to supply a downstream ramp 21 in a calibrated way extends. This downstream ramp 21 in turn supplies with fresh air a set of slots 22 for cooling the trailing edge 17. This vane further includes other parts not represented as in particular an upstream duct and/or ramp, located upstream of the central duct and arranged to provide cooling air to the leading edge.

In the region corresponding to the apex S of the vane, the central duct 18 extends to an upper cavity 23 for cooling the vane apex. This upper cavity 23 extends from the central or upstream part to the downstream part of the vane, and it supplies through its downstream portion the last slot 24 for cooling the trailing edge. This last slot 24 is the one which is closest to the vane apex S along the span direction EV.

As visible in FIG. 3, the central duct 18 extends substantially on the entire height of the blade along the span direction EV. The end of the central duct 18 which is located in the region of the vane apex is connected to an upstream part of the upper cavity 23 in order to supply this upper cavity with cooling air.

The central duct 18 and the upper cavity 23 supplied by this central duct are delimited upon manufacturing the vane by an element E1 being part of a core, this core being removed for example by chemical etching when the vane has been cast.

The duct 19 has a length substantially lower than the duct 18, it comes along this duct 18 and its free end is located facing the upper cavity 23. It communicates with the downstream ramp 21 by a series of calibrated holes 26 which are distributed and evenly spaced on the entire length of the ramp 21 along the span direction EV, and oriented perpendicular to this direction EV. These communication holes 26 enable a calibrated supply to the ramp 21 to be ensured, such that the air flow rate is as homogenous as possible in the different slots for cooling the trailing edge.

The downstream duct 19 and the downstream ramp 21 are delimited upon manufacturing the vane by a second element E2 making another part of the core which is removed after moulding the vane by chemical etching.

Holes 25 can be made through the pressure face and suction face walls of the vane to discharge air circulating in its inner space while forming an external air film coming along the pressure face to insulate it from the flow heat surrounding the vane during operation.

As visible in FIG. 3, the downstream ramp 21 comes along the downstream duct 19 to include, as this duct 19, a free end 27 located facing the upper cavity 23. But this downstream ramp 21 has a length lower than that of the duct 19 along the span direction EV, because it does not start at the blade base.

The downstream ramp 21 has a lower end 28 which is spaced from the blade base, such that this downstream ramp 21 supplies with air the slots 22 of the trailing edge which include the second slot starting from the base of the blade and the following ones up to penultimate slot before reaching the blade apex.

As indicated above, it is the downstream portion of the upper cavity 23 which supplies the last slot 24. But it is also a distinct lower cavity, referred to as 29, which distinctly and independently supplies the first slot, that is the slot 31. This slot 31 is the first slot of the trailing edge 17, starting from the blade base, that is the slot of the trailing edge 17 which is closest to the root P of the vane.

Thus, the downstream ramp 21 extends as the extension of the lower cavity 29, the lower cavity 29 and the ramp 21 both coming along the downstream duct 19. But the lower cavity 29 is directly supplied with air from the root P of the blade 11, instead of being supplied by the downstream duct 19, and it only supplies the first slot 31 for cooling the trailing edge 17 of the blade.

Upon manufacturing, the lower cavity 29 is also delimited by an element E3 forming another part of the core which is removed by chemical etching at the end of moulding.

Alternatively, the vane could be made by the additive manufacturing method.

Under these conditions, supplying the slots for cooling the trailing edge 17 with air is distinctly ensured for the first slot 31 and for the last slot 24, respectively through the lower cavity 29 and through the upper cavity 23. This supply is jointly ensured by the ramp 21 for all the intermediate slots 22 which are located between the first slot 31 and the last slot 24.

The slots of the trailing edge 17 can be distinguished into three zones, that is a first zone Z1 close to the base only comprising the first slot in the example of the figures, a second so-called intermediate zone Z2 including a series of intermediate slots, and a third zone Z3 corresponding to the apex and only including the last slot in the example of the figures. These three zones Z1, Z2, Z3 are independently supplied with cooling air, so as to optimise and regulate at best cooling of the trailing edge.

It could be optionally provided that the first zone Z1 includes not a single first slot as in the example of the figures, but several first adjoining slots which are closest to the root. In the same way, the third zone can also include not a single last slot as in the example of the figures, but several of the last adjoining slots located at the vane apex, that is several last slots and not a single one as in the example of the figures.

As visible in FIG. 3, the limit between the first zone Z1 and the second zone Z2 is located well below half the height of the blade along the span axis EV. In practice, the first slots, which correspond to the first zone Z1, extend over about twenty percent of the height of the trailing edge along the axis EV starting from the blade base, that is starting from the platform separating the vane root from the blade.

In addition, the central duct 18 can be thermally insulated from the pressure face and suction face walls 14 of the vane by a pressure face side cavity 32 and/or by a suction face side cavity 33, as illustrated in FIGS. 4 and 5.

The side cavity 32 thereby has a small thickness by extending facing most of the area of the duct 18, so as to make a heat screen: the duct 18 is thereby separated from the pressure face wall by this side cavity 32.

The side cavity 33 which is of the same type, analogously makes a heat screen which is located on the suction face side of the vane, to separate the duct 18 from the suction face wall.

Each side cavity 32, 33 is formed as a single piece, and it comes along the pressure face or the suction face, having a small thickness. It is delimited by a generally rectangular contour and it extends on most of the height of the blade and on the entire length of the upstream duct along the pressure face, the suction face or the axis AX. Each side cavity 32, 33 is supplied with air via the vane root directly, that is independently of the other ducts, cavities or ramps of the vane.

In the example of the figures, the side cavities 32, 33 only cover the central duct 18, but their length can also be extended such that they also cover the downstream duct 19 in order to insulate it also from the pressure face and/or suction face walls of the vane. The length of the side cavities 32, 33 can also be extended upstream to cover other cavities of the vane.

The distinct and independent supply of the ducts 18 and 19 and of the cavity 29 can be ensured by three distinct mouths each collecting air independently at the blade root. This distinct supply can also be ensured, as schematically represented in FIG. 6, by a same mouth 34, so at to facilitate manufacturing the vane, located at the blade root and which is split into three distinct channels to supply separately the ducts 18, 19 and the cavity 29.

The invention enables cooling of the trailing edge of a vane of a high pressure stage to be optimised, by promoting venting the vane apex and the bottom blade zone without deteriorating that of the intermediate region of the trailing edge.

The independent supply of the first slot(s) enables cooling of this zone to be better controlled to avoid in particular air shearing phenomena at the inlet of these slots. It enables cooling the trailing edge to be improved in the blade base region which undergoes all the centrifugal strains applied to the operating blade. In practice, this region is subject to the occurrence of incipient breaks at the fillet with the root or the platform of the blade. The platform designates the generally planar portion with an orientation normal to the span axis located between the blade and the root.

The independent supply of the last slot(s) enables cooling of the trailing edge to be optimised in the apex region where high temperatures give rise to significant stresses. These significant stresses can result in burning, oxidations, and losses of material that can be significant.

Analogously, the independent supply of the intermediate slots enables a suitable cooling level to be preserved for the median portion of the trailing edge. The implementation of a calibrated supply of the downstream ramp for supplying the intermediate slots enables cooling to be homogenised over the height, while limiting temperature rises and head losses.

Generally, distinguishing three zones for cooling the trailing edge enables cooling of the different parts of the trailing edge to be calibrated or more finely regulated in order to increase cooling in the critical portions for this trailing edge.

In practice, thanks to the three distinct supplies with air for cooling the trailing edge, the risk of a heterogeneous cooling penalising the first slots and the last slots, for example due to internal turbulences, is excluded. The invention thus enables an optimal cooling to be ensured in any circumstance for the critical parts of the trailing edge.

The invention claimed is:

1. A vane of a turbomachine turbine, the vane comprising:
a root carrying a blade extending along a span direction ending in an apex, the blade comprising a leading edge and a trailing edge located downstream of the leading edge, the blade comprising a pressure face wall and a suction face wall each connecting the leading edge to the trailing edge, the trailing edge including on the pressure face side, a series of through slots configured to be supplied with cooling air,
wherein the slots include:
one or more first slots which are closest to the root and which are supplied distinctly and independently by a lower cavity of the vane;
one or more last slots which are closest to the apex and which are supplied distinctly and independently by an upper cavity of the vane; and
intermediate slots located between the first slots and the last slots and which are supplied distinctly and independently by an intermediate cavity of the blade;
the lower cavity being closest to the root, the upper cavity being closest to the apex, and the intermediate cavity being arranged between the lower cavity and the upper cavity,
wherein the lower cavity, the upper cavity and the intermediate cavity are distinctly supplied with air at the root of the vane; and
wherein the vane comprises an intermediate duct for supplying the intermediate cavity with air, the intermediate duct being connected to the intermediate cavity by a series of holes to provide calibrated supply to the intermediate cavity,
the vane further comprising a central duct and a pressure face side cavity located between the central duct and the pressure face wall of the blade to form a heat screen protecting the central duct, and
the vane further comprising a suction face side cavity located between the central duct and the suction face wall of the blade to form a heat screen protecting the central duct.

2. The vane according to claim 1, wherein the lower cavity and the intermediate cavity for cooling the intermediate slots extend along a same direction parallel to the span direction of the blade.

3. The vane according to claim 1, comprising at least one of a single first slot or a single last slot.

4. The vane according to claim 1, wherein the upper cavity is located at the apex of the vane by being arranged to cool the apex.

5. A moulding means for manufacturing a vane according to claim 1, comprising a core for delimiting at least one part of an inner space of the vane when manufactured by moulding.

6. A turbomachine turbine comprising a vane according to claim 1.

7. A The turbomachine comprising the turbomachine turbine according to claim 6.

8. The vane according to claim 1, wherein a length of the intermediate duct in the span direction is less than a length of the central duct in the span direction, and a free end of the intermediate duct is located facing the upper cavity.

\* \* \* \* \*